G. N. MILCO.
Insect-Powder Injectors.
No. 198,807. Patented Jan. 1, 1878.
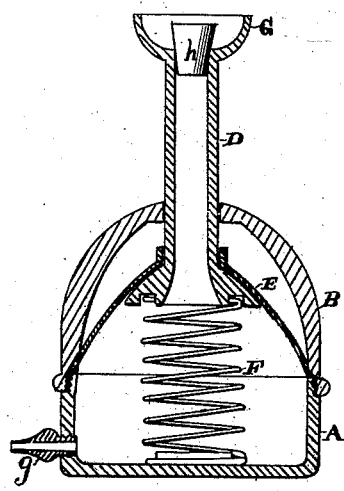
Witnesses
Geo. H. Strong
Jno. L. Borno
Inventor
Giovanni N. Milco
by Dewey &
Attys.

UNITED STATES PATENT OFFICE.

GIOVANNI N. MILCO, OF STOCKTON, CALIFORNIA.

IMPROVEMENT IN INSECT-POWDER INJECTORS.

Specification forming part of Letters Patent No. 198,807, dated January 1, 1878; application filed May 23, 1877.

*To all whom it may concern:*

Be it known that I, GIOVANNI N. MILCO, of Stockton, county of San Joaquin, and State of California, have invented a Device for Ejecting and Scattering Insect-Powder; and I do hereby declare the following to be a full, clear, and exact description thereof, reference being had to the accompanying drawing.

My invention relates to a convenient and effective implement for forcibly ejecting a powder, such as is used for exterminating insects, into the atmosphere of a room, or against or upon any object which it is desired to sprinkle with the powder. This implement I call a "Buhach-Insufflator."

Referring to the accompanying drawing, the figure is a vertical section.

Let A represent the bottom, and B the top, of the containing vessel or barrel of my insufflator. I prefer to make the upper part B of this vessel semi-globular, as represented; but it can be made cylindrical, with a closed top, if desired. The top and bottom of this vessel are connected together by a screw-connection or otherwise. A hollow stem or piston-rod, D, passes down through a hole in the center of the top B, and to the lower end of this stem or piston-rod, inside of the vessel, is secured a piston or diaphragm, E, which conforms to the shape of the top or upper part of the vessel.

In the present instance I have represented a flexible cup-shaped piston or diaphragm, inverted, to fit the semi-globular shape of the upper part B, and having its lower portion secured between the parts A B. The lower end of the piston-rod rests upon the upper end of a spiral spring, F. This spring is secured to the center of the bottom of the vessel, and extends up as far as it is desired to raise the piston. $g$ is a small nozzle, which is secured to the vessel near its bottom, so as to project a short distance from it. As before mentioned, the piston-rod D is hollow or tubular. The object of making it hollow or tubular is to enable me to introduce the powder through the piston-rod into the vessel; and to facilitate the introduction of the powder into the upper end of the hollow rod, I provide it with a cup-shaped upper end, G, into which the powder is first poured.

After a sufficient quantity of the powder has been introduced I place a cork or other stopper, $h$, in the upper end of the tubular stem or rod, so as to prevent the powder from coming out again; but a solid piston could be used if preferred, in which case the parts A B of the vessel would have to be separated in order to introduce the powder to the interior of the vessel. This device is small, so that it can be carried about in a room and operated by hand.

After the powder is introduced into the vessel it can be ejected in fine streams, so as to be disseminated throughout the atmosphere of a room, or sprinkled upon any object, by suddenly depressing the piston, so as to force it out through the nozzle.

This implement is quite simple and convenient, and it enables me to scatter and apply my improved exterminating-powder, which I call "Buhach," and for which I have made application for separate Letters Patent, or it may be used for scattering and applying any other powder.

Having thus described my invention, what I claim, and desire to secure by Letters Patent, is—

The cylinder or vessel A B, with its nozzle $g$, in combination with the piston or diaphragm E, hollow piston-rod D, with its cup-shaped upper end G, and the spiral spring F, substantially as and for the purpose described.

In witness whereof I have hereunto set my hand and seal.

GIOVANNI NATALE MILCO. [L. S.]

Witnesses:
W. R. LOUTTIT,
O. F. ATWOOD.